United States Patent [19]

Morikawa et al.

[11] Patent Number: 4,491,885
[45] Date of Patent: Jan. 1, 1985

[54] MAGNETIC RECORDING/PLAYBACK DEVICE

[75] Inventors: Toshinori Morikawa, Katano; Seiko Minamide, Nara; Satoshi Kikuya, Katano; Hiroshi Terada, Hirakata; Osamu Zaitsu, Moriguchi; Narito Shibaike, Habikino, all of Japan

[73] Assignee: Matsushita Electric Industrial Co., Ltd., Osaka, Japan

[21] Appl. No.: 344,788

[22] Filed: Feb. 1, 1982

[30] Foreign Application Priority Data

| Feb. 6, 1981 | [JP] | Japan | 56-17322 |
| Feb. 6, 1981 | [JP] | Japan | 56-17323 |
| Feb. 6, 1981 | [JP] | Japan | 56-17324 |
| Feb. 6, 1981 | [JP] | Japan | 56-16566[U] |
| Oct. 5, 1981 | [JP] | Japan | 56-158948 |

[51] Int. Cl.³ .................. G11B 5/08; G11B 15/66; G11B 15/18
[52] U.S. Cl. ............................... 360/85; 360/95
[58] Field of Search .......... 360/85, 95, 96.4, 96.1, 360/96.2, 96.3; 242/197

[56] References Cited

U.S. PATENT DOCUMENTS

| 4,121,267 | 10/1978 | Hayashi | 360/95 |
| 4,357,639 | 11/1982 | Hama | 360/85 |
| 4,388,658 | 6/1983 | Kajino | 360/85 |
| 4,408,236 | 10/1983 | Murata | 360/85 |

Primary Examiner—Robert M. Kilgore
Attorney, Agent, or Firm—Stevens, Davis, Miller & Mosher

[57] ABSTRACT

A magnetic recording/playback device in which a tape mounting device for mounting a magnetic tape in a cassette on a magnetic head drum or demounting the tape from the magnetic head drum into the cassette and a mode switching driving device adapted for effecting a switching of operation mode such as recording, playback, rewinding and forwarding are driven by a single driving power source, in good sequence through a change of the load imposed by the tape mounting device and the mode switching driving device, to permit a reduction in size and weight of the recording/playback device.

5 Claims, 25 Drawing Figures

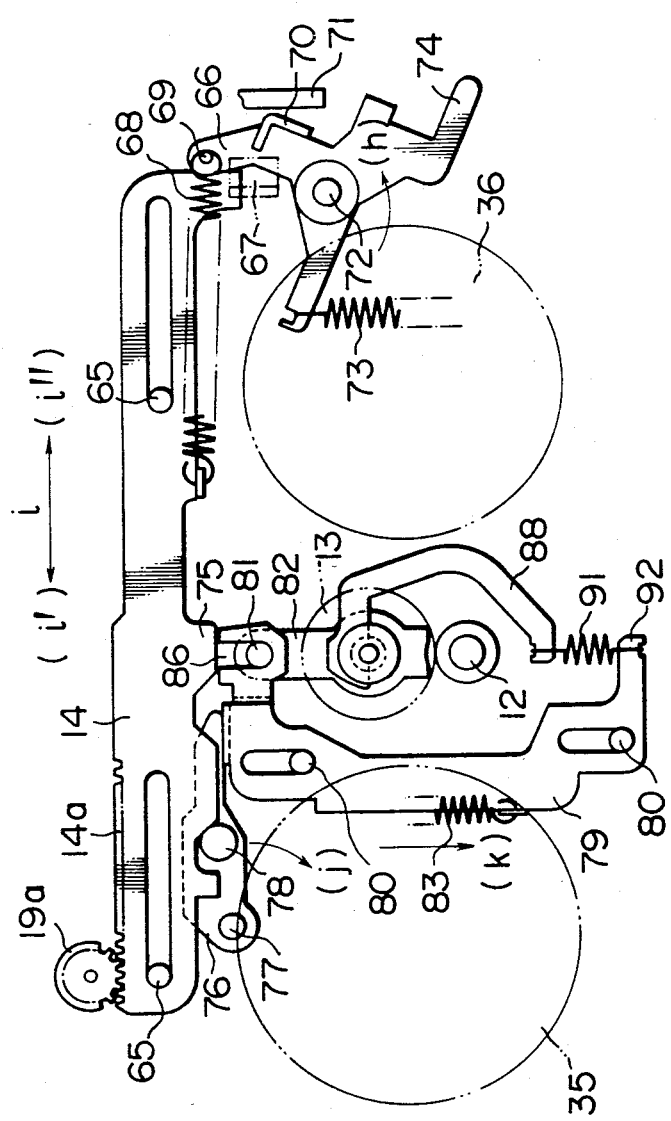

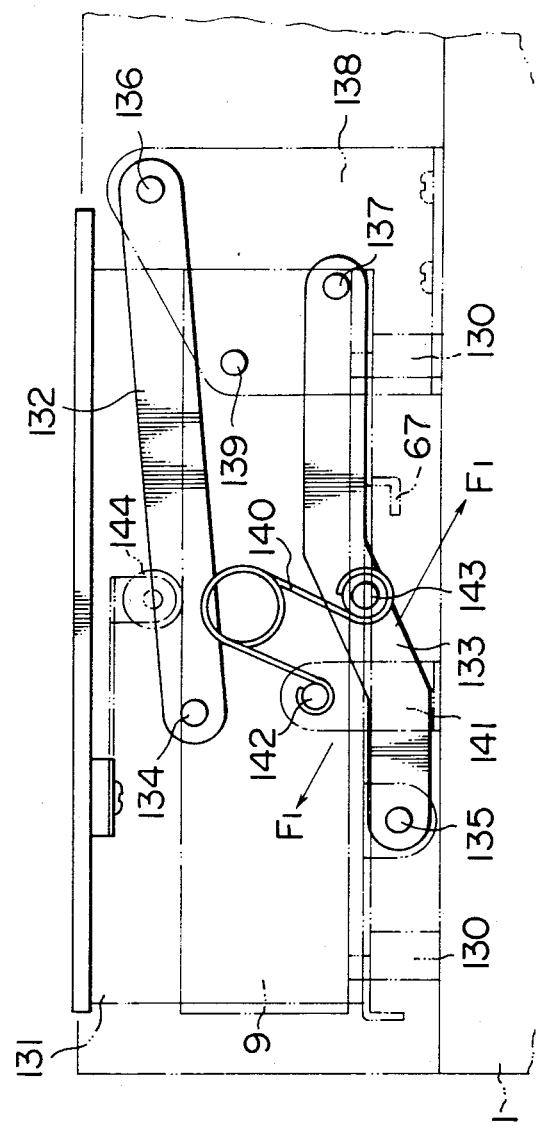

MAGNETIC RECORDING/PLAYBACK DEVICE

BACKGROUND OF THE INVENTION

1. Field of the Invention

The present invention relates to a magnetic recording/playback apparatus and, more particularly, to a device in which a magnetic tape is extracted from a cassette and mounted on a magnetic head drum and, thereafter, the switching of operation mode is effected to permit an operation such as recording and playback.

2. Description of the Prior Art

There are various types of means for loading tape in the magnetic recording/playback device such as of cassette tape type, as well as for switching the operation mode between recording and playback. One of these known means incorporate independent motors for mounting the tape and for switching the operation mode, respectively. Another type of known means includes a motor specifically intended for the mounting of the tape and at least one electromagnetic means (solenoid) for the switching of operation mode. Still another known means employs a motor specifically intended for the mounting of tape, the tape mounting device having a cam which produces the power for effecting the switching of operation mode, with an assist of a manual mechanism.

These conventional means, however, are not preferred from the view point of reduction of size and weight of the device because of necessity for motors or a combination of a motor and solenoid means for loading the tape and for effecting the switching of operation mode. The use of a plurality of driving sources is not suitable for the devices of portable type. In addition, these driving sources consume a considerable electric power so that it is impossible to obtain an energy-saving type device with these known means, further these means cannot be used in devices which are required to operate for a long time under the power supply from a battery.

The tape loading and operation mode switching means incorporating the cam requires quite a complicated construction of the device, impractically increasing the number of parts and, hence, making assembly troublesome and difficult. Problems are imposed also in connection with assembly; precision, durability and reliability of operation.

SUMMARY OF THE INVENTION

Under these circumstances, the present invention aims as it major object at providing a magnetic recording/playback device having reduced size and weight, by realizing a drive change-over means which makes a rational change of the load on a single driving source to make it possible to drive in sequence, with the single drive source, both of a tape mounting means which extracts the tape from a cassette and mounts the same on a head drum incorporating a rotary magnetic head, and a mode switching means which effects a selection and switching of operation mode such as recording/-playback and forwarding/rewinding.

To this end, according to the invention, there is provided a magnetic recording/playback device having a planetary gear unit section which is connected at its input side to a driving source through a reversing prevention means and having a first output portion and a second output portion; a tape mounting means connected to the first output portion of the planetary gear unit section; a mode switching drive means connected to the second output portion of the planetary gear unit section and adapted to effect a switching of operation mode such as between recording and playback; a resilient member retained by the mode switching driving means and adapted to impart a load greater than the load imposed during the mounting operation of the tape mounting means; stroke limiting means for limiting the starting and stopping ends of movement of the tape mounting means; and a stopper portion for the mode switching mounting means.

BRIEF DESCRIPTION OF THE DRAWINGS

FIG. 7 is an illustration of a tape driving section in the state before the operation of the device;

FIG. 25 is a side elevational view of the essential part shown in FIG. 24 in another state of operation.

DESCRIPTION OF THE PREFERRED EMBODIMENTS

The invention aims at providing a magnetic recording/playback device in which a plurality of mechanisms are operated in good sequence by a single driving source, thereby to achieve a reduction in size and weight, while attaining a protection of the tape in the operation mode.

A magnetic recording/playback device constructed in accordance with a preferred embodiment of the invention will be described hereinunder with reference to the accompanying drawings.

Figure 1:
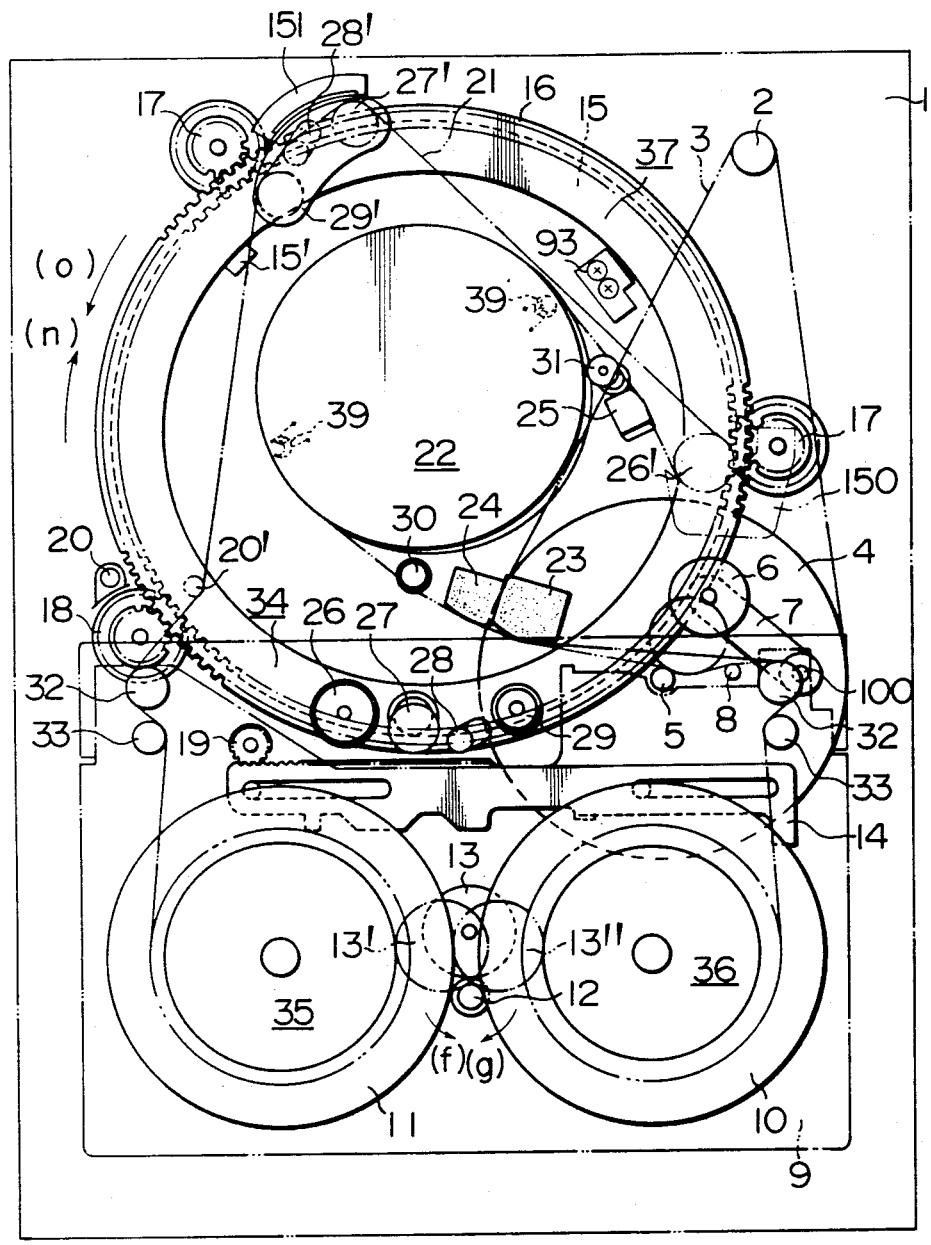
FIG. 1 shows the general arrangement of a magnetic recording/playback device in accordance with an embodiment of the invention.
Figure 2:
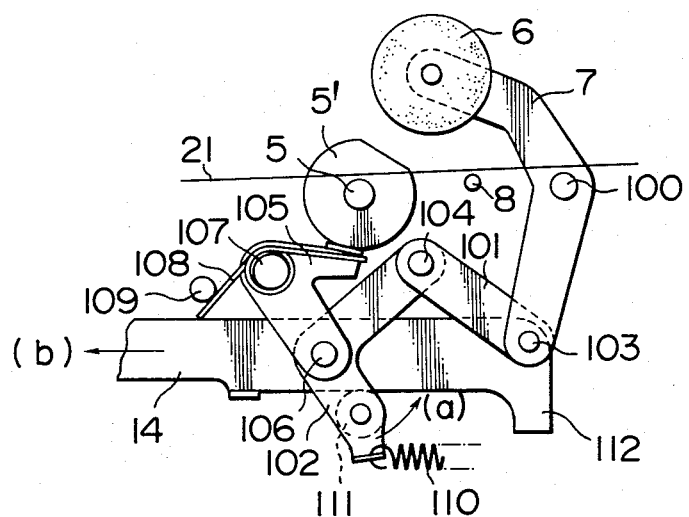
FIGS. 2 and 3 are illustrations of operation of a capstan roller and operation of a pinch roller.

Referring first to FIG. 1, a magnetic recording/-playback device has a base plate 1. A motor pulley 2 for driving a capstan is connected to a fly-wheel 4 integral with a capstan 5, through a belt 3. A pinch roller 6 is adapted to be pressed against the capstan 5 with a magnetic tape 21 interposed therebetween. Namely, the capstan 5 and the pinch roller 6 cooperate with each other in clamping the tape 21 therebetween and feeding the same at a constant speed. Reference numeral 7 denotes a pinch roller arm rotatably connected to a shaft 100 standing upright from the base plate 1. As will be seen from FIGS. 2 and 3, the pinch roller arm 7 is rotatably connected through a pin 103 to a toggle lever 101 which in turn is rotatably connected to a toggle lever 102 through a pin 104. The toggle lever 102 is rotatably connected at its central portion to a shaft 106 provided on an abutting plate 105, and retains at a portion thereof a reset spring 110. The reset spring 110 biases the toggle lever around the shaft 106 as indicated by an arrow (a).

The abutting plate 105 is rotatably connected to a shaft 106 provided on the base plate 1 and is biased at its one end by a bias spring 108 into contact with a capstan housing 5'. Thus, the rotational position of the abutting plate 105 is limited by the capstan housing 5'. Reference numeral 109 designates one of the stoppers for the bias spring 108, while 111 designates an engaging shaft provided on the toggle lever. These parts in combination constitute a toggle mechanism for pressing the pinch roller 6 against the capstan 5 thus forming a means for feeding the tape 21 at a constant speed. As the operation mode switching means 14 is moved in the direction of the arrow (b) while the pinch roller 6 is pressed against the capstan 5, an engaging portion 112 of the operation mode switching means 14 is brought into contact with the engaging shaft 111 of the toggle lever 102 to rotate the latter around the shaft 101 in the direction of an arrow (c) in FIG. 3. As the operation switching means 14 is moved further, the abutting plate 105 is rotated around the shaft 107 overcoming the force of the bias spring 108 in the direction of the arrow (d), so that the toggle lever 101, toggle lever 102 and the arm 7 act to move the pinch roller 6 in the direction of an arrow (e) in FIG. 3 into pressure contact with the capstan 5, thereby to effect the feed of the tape 21 at the constant speed.

Referring again to FIG. 1, a running post 8 serves as a damper between the capstan 5 and the post 32 of the cassette 9. The arrangement is such that the magnetic tape 21 is wound round the running post 8 by a predetermined amount only when the pinch roller 6 is pressed against the capstan 5. If this running post 8 is not provided, the running of the tape is adversely affected by a plurality of rotary posts 32 and 33 in the cassette 9, the precision of the rotary posts being not so high, such that the running of the tape between the capstan 5 and the take-up reel 10 is unstabilized due to inclination of the rotary posts 32, 33 or the rotation of the same. This unstable running of the tape may adversely affect also the running of the tape 21 between the capstan 5 and the pay-off reel 11. For this reason, the conventional recording/playback devices have often suffered a deterioration in the interchangeability and audio wow characteristics.

An explanation will be made hereinunder as to the operation mode switching means and the reel driving means which in combination constitute a mode switching driving means. As will be described later, a reel driving center pulley 12 is provided substantially at the mid point between a pay-off reel base 35 and a take-up reel base 36. As the operation mode switching means 14 is moved during the recording/playback operation or the forwarding/rewinding, a driving idler 13 is made to contact with the center pulley 12. As a result of friction between the center pulley 12 and the driving idler 13, the driving idler 13 is deflected toward the pay-off reel base 35 due to the direction of rotation of the center pulley 12, e.g. the counter-clockwise direction as indicated by an arrow f during rewinding of the tape, so that the driving idler 13 comes to take a position indicated by numeral 13'. Also, during the forwarding of the tape, since the center pulley 12 is rotated clockwise as indicated by an arrow (g), the idler 13 is deflected toward the take-up reel base 36 to take a position designated at numeral 13", thereby to transmit the torque of the center pulley 12 to the pay-off reel 11 and the take-up reel 10. A main ring 15 and an auxiliary ring 16 in combination constitute a tape mounting means 37. These rings are superposed to each other coaxially and are adapted to rotate independently of each other, and are provided at their peripheries with teeth portions for engagement with a first output portion 18 of a planetary gear unit section 38 which will be explained later. A plurality of limiting rings 17 are adapted to engage with the peripheral teeth of the main ring 15 and the auxiliary ring 16 thereby to rotatably support these rings. Reference numeral 19 designates a second output portion of the planetary gear unit section 38 which is in engagement with toothed portion 14a of the operation mode switching means 14 as will be seen from FIG. 7. Reference numeral 20 designates a tension servo post of a later-mentioned tension servo unit 113. The tension servo post 20 is adapted to be moved to a position denoted by 20' in the recording/playback mode to make contact with the magnetic tape 21 thereby to effect the back tension control of the magnetic tape 21.

Reference numeral 22 designates a magnetic head drum incorporating a pair of rotary magnetic heads 39, 23 designates a head for audio and control signal. 24 designates an audio erase head and 25 designates a full erase head for erasal of entire width of the tape.

Reference numerals 30 and 31 denote limiting posts adapted to limit the position of the magnetic tape 21 at the inlet side and outlet side of the magnetic head drum 22.

Figure 5:
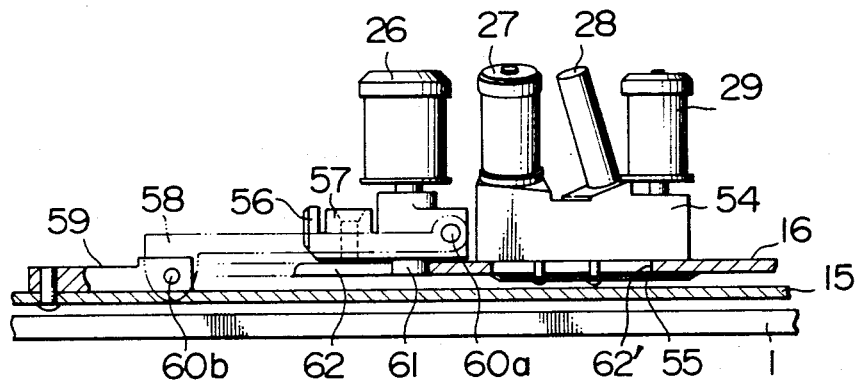
FIGS. 5 and 6 are detailed illustration of a tape mounting means.
Figure 6:
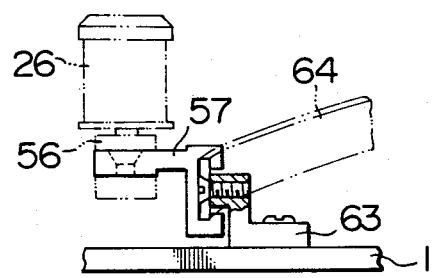
Figure 8:
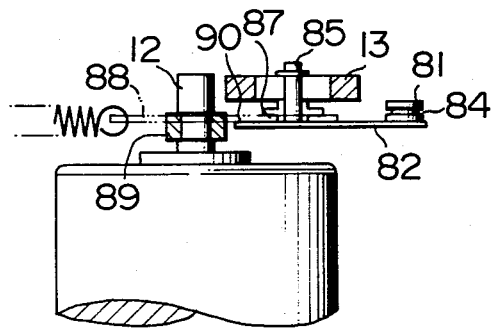
FIGS. 8 and 9 are illustrations of portions of the tape driving section.
Figure 9:
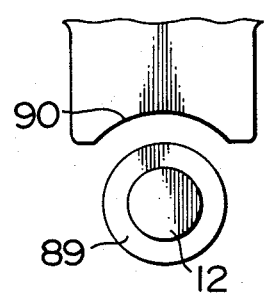
Figure 10:
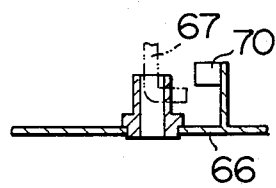
FIG. 10 is an illustration of a locking means of a cassette containment section.
Figure 11:
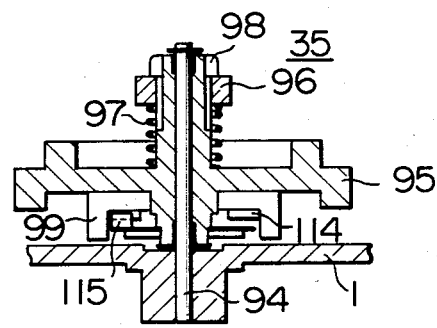
FIGS. 11 to 13 are illustrations of construction of a pay-off reel bed.
Figure 23:
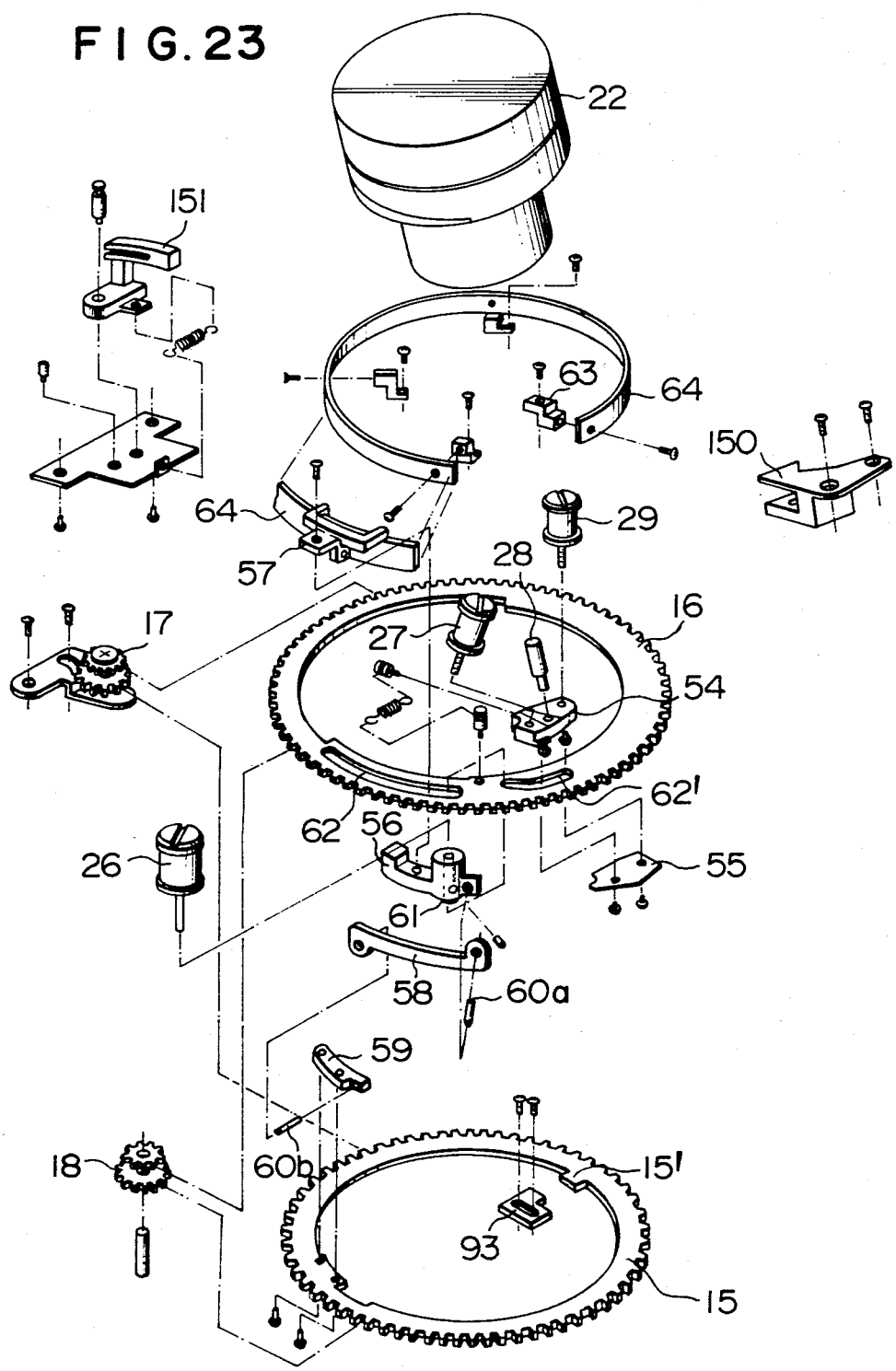
FIG. 23 is an exploded perspective view of an essential part of the first embodiment.

An explanation will be made hereinunder as to the construction and operation of a tape extraction post 26 and correction posts 27, 28 and 29, with specific reference to FIGS. 5, 6 and 23.

The correction posts 27, 28 and 29 are mounted on a correction base 54 to protrude upright therefrom at respective predetermined correction angles. On the other hand, the lower side of the correction base 54 is mounted in an elongated hole 62' provided in the auxiliary ring 16 through a leaf spring 55 and by means of a small screw, such that the correction base 54 is movable along the elongated hole 62'.

More specifically, the correction base 54 is moved as the auxiliary ring 16 is rotated in the direction of an arrow (n). As the correction base 54 makes contact with a stopper 151 fixed to the base plate 1, the correction base 54 is stopped after a slight movement along the elongated hole so that the correction posts 27, 28 and 29 are held at positions indicated at 27', 28' and 29' in FIG. 1, respectively.

The tape extraction post 26 is mounted on the main board 56. The main board 56 is provided at its lower side with a projection 61 which engages with an elongated hole 62 provided in the auxiliary ring 16, so that the main board 56 is slidable along the elongated hole 62.

Furthermore, the main board 56 is provided with a grip hand 57 which slidably engages with a guide plate 64 constituted in a spiral form relatively to the plane of the base plate 1 around the magnetic head drum 22 by a plurality of supporting plates 63 fixed to the base plate 1.

A connecting member 58 is rotatably connected at its one end to the main board 56 through a pin 60a, while the other end of the same is connected rotatably through a pin 60b to a connecting member 59 which is fixed at its one end to a main ring 15.

Therefore, the main board 56 is progressively moved along the guide plate 54 formed spirally around the magnetic drum head 22, in accordance with the rotation of the main ring 15 in the direction (n), until the main board 56 is stopped by a stopper 150 provided on the base plate 1. In this state, the tape extraction post 26 is held at a position designated at numeral 26′ in FIG. 1, so that the magnetic tape 21 is wound at a predetermined angle around the magnetic head drum 22 as indicated by a two-dots-and-dash line in FIG. 1.

Figure 4:
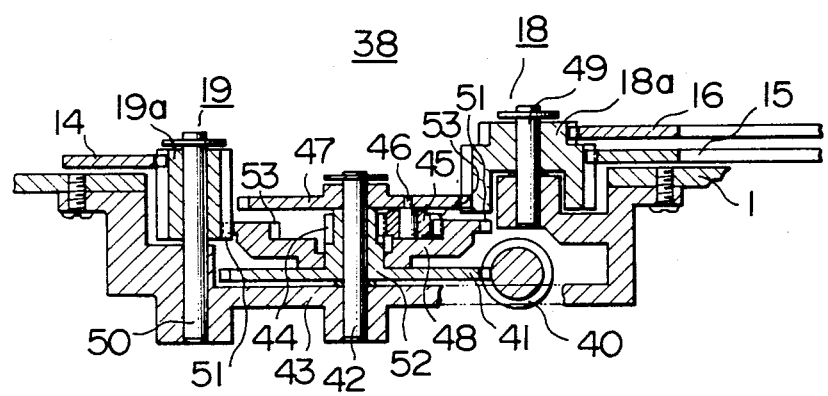
FIG. 4 is an illustration of a planetary gear unit section.

The construction of the planetary gear unit section 38 will be described hereinunder with reference to FIG. 4. Reference numeral 40 designates a worm directly connected to a motor (not shown) which is a reversible driving souce, while 41 designates a worm wheel gear adapted to engage the worm 40 and rotatably connected to a shaft 42 provided on the unit base 43. The worm 40 and worm wheel 41 meshing with each other in combination constitute a reversing prevention mechanism. A toothed portion 44 is provided on the upper portion of the worm wheel gear 41 coaxially therewith so as to constitute a sun gear 52. Reference numeral 45 denotes a planetary gear rotatably connected to a shaft 46 provided on an arm gear 47 rotatably connected to the above-mentioned shaft 42. The planetary gear 45 in one hand makes engagement with the teeth 44 of the sun gear 52 and on the other hand with the internal teeth of an internal gear 48 rotatably connected to a portion of the sun gear 52. Reference numeral 49 designates a shaft for supporting a gear 18a which constitutes the first output portion of the planetary gear unit section 38. The gear 18a in one hand meshes with the aforementioned arm gear 47 and on the other hand with the main ring 15 and the auxiliary ring 16 with a predetermined difference of diameter. The difference of diameter between the main ring 15 and the auxiliary ring 16 is provided is provided due to the difference in the stroke between the tape extraction post 26 and the correction posts 27, 28 and 29. Thus, the difference of diameter is provided between the main ring 15 and the auxiliary ring 16 so that these rings in combination constitute a differential gear mechanism. Namely, as the gear 18a of the first output portion 18 is rotated counterclockwise, the main ring 15 and the auxiliary ring 16 are rotated in the direction of the arrow n in FIG. 1. The speed of rotation of the main ring 15 is higher than that of the auxiliary ring 16.

A gear 19a constituting the second output portion 19 of the planetary gear unit section 38 is supported by a shaft 50. The gear 19a of the second output portion 19 meshes on the one hand with the external teeth 51 of the internal gear 48 and on the other hand with the toothed portion 14a of the operation mode switching means 14. The planetary gear unit section 38 is constituted by the gears mentioned hereinbefore.

As to the unloading operation, the arrangement is as follows. Namely, as the first output portion 18 is rotated clockwise, the correction posts 27, 28 and 29 and the tape extraction post 26 are rotated in the direction of an arrow (o), so that a projection 15′ of the main ring 15 is brought into contact with an unload end stopper 93 provided on the base plate 1, thereby to limit the rotation of the main ring 15 and the auxiliary ring 16.

An explanation will be made hereinunder as to the mounting of a cassette containing a magnetic tape, with reference to FIGS. 24 and 25.

The base plate 1 is provided with a height limiting portion 130 for a cassette housing 131 which houses a cassette 9 and which is adapted to be mounted on the device. The cassette housing 131 is provided on the inner upper surface thereof with a roller 144 which is resiliently biased downwardly by a leaf spring 145. The cassette housing 131 is further provided on its lower surface with an engaging portion 67 adapted to engage a hook portion 70 in a locking means 66 mounted on the device. A first lever 132 for lifting is pivotally secured to one side of the cassette housing 131 by means of a shaft 134. The other end of the first lever 132 is rotatably secured by a shaft 136 to a plate 138 provided on the base plate 1. To the lower end portion of the side wall of the cassette housing 131, pivotally secured by means of a shaft 135 is a second lever 133 for lifting. The other end of the second lever 133 is rotatably secured to the plate 138 by means of a shaft 137. The plate 138 is provided with a stopper member 139 adapted to be contacted by the second lever 133 thereby to limit the upward movement of the cassette housing 131. A torsion coiled spring 140 for biasing the cassette housing 131 to the raised position or lowered position is rotatably connected at its one end to a shaft 143 provided on the second lever 133. The other end of the torsion coiled spring 140 is rotatably connected to a shaft F on a sub-plate 141 provided on the base plate 1.

Figure 24:
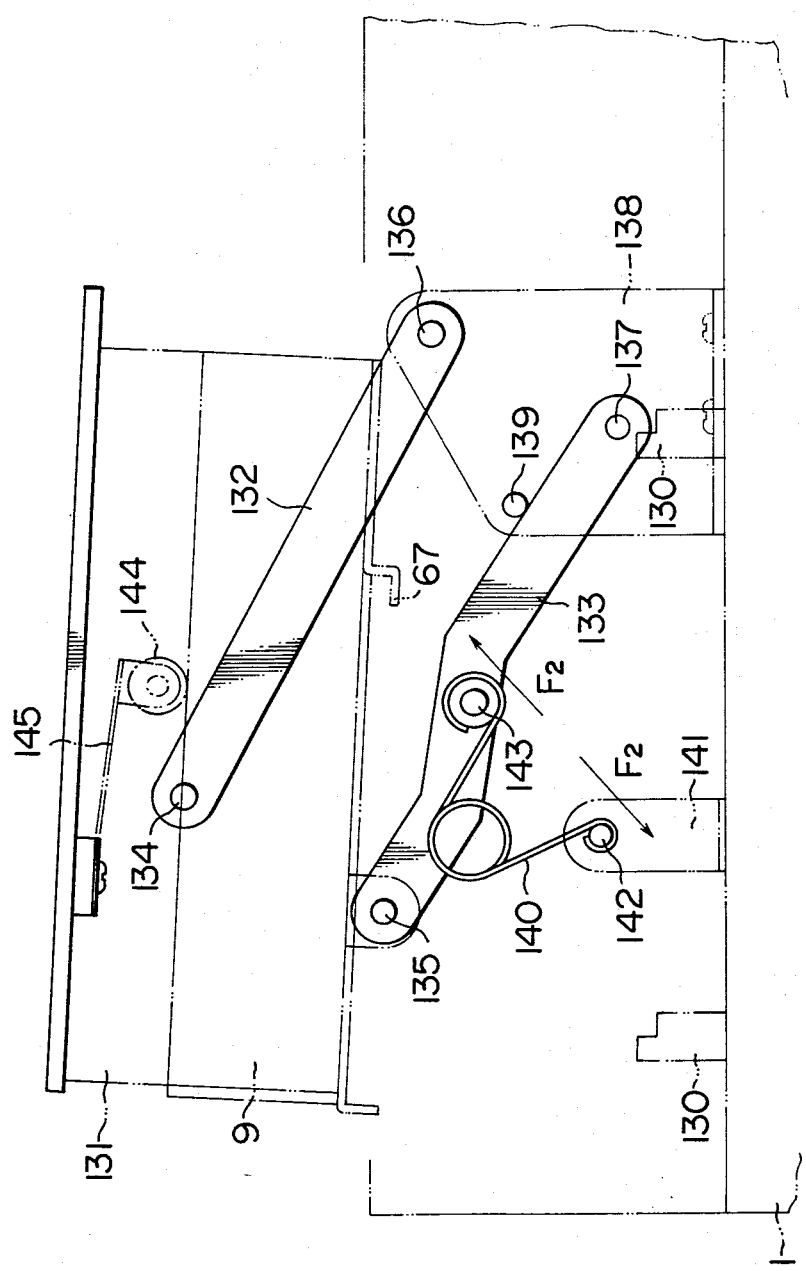
FIG. 24 is a side elevational view of an essential part of the device of the invention in one state of operation.

In use, the cassette 9 is inserted into the cassette housing 131 having the described construction, and the cassette housing 131 is pressed downwardly so that the cassette housing 131 is rotated around the shafts 136 and 137 against the biasing force of the torsion coiled spring 140 acting in the direction of an arrow F2, from the position shown in FIG. 24 to the position shown in FIG. 25. As the cassette housing 131 is moved to the position shown in FIG. 25, since one 143 of the shafts of the torsion coiled spring 140 is positioned at the same side of the line interconnecting the other shaft 142 and the shaft 137 supporting the lever 133 as the base plate 1, the torsion coiled spring exerts a biasing force in the direction of the arrow F in FIG. 1, thereby to press and hold the cassette housing 131 at the same side as the base plate 131 through the second lever 133. Also, the biasing action of the torsion coiled spring 140 in the direction of the arrow F1 is limited by the contact between the lower portion of the cassette 9 with the stopper 130 provided on the base plate 1. The lifting of the cassette housing 131 is made as follows. Namely, the cassette housing 131 is raised by a lifting lever (not shown) until one shaft 143 of the shafts of the torsion coiled spring 140 is moved to a position above the line interconnecting the other shaft 142 and the shaft 137 supporting the second lever 133. In this state, the biasing force of the torsion coiled spring 140 is exerted in the direction of the arrow F2 for lifting the cassette housing 131, so that the cassette housing 131 is held at the position where the second lever 133 is stopped by the stopper member 139.

An explanation will be made hereinunder as to the reel driving means and the cassette housing, with specific reference to FIGS. 7 thru 10. Referring to FIG. 7, the operation mode switching means 14 has the toothed portion engaged by the gear 19a of the second output portion 19 of the planetary gear unit section 38, and is held slidably by a shaft 65. A locking means 66 is adapted to lock an engaging portion 67 (only a retaining portion of engaging portion is shown) of the cassette housing 131 adapted to be held at the raised and lowered positions in a clicking manner. The locking means 66 is provided with a pin 69. A portion of the operation mode switching means 14 is connected to the pin 69 by a first resilient member 68 to make contact with the latter, such that the operation mode switching means 14 and the locking means 66 pull each other. The first resilient member 68 is adjusted to have an initial tensile load greater than the load imposed by the tape mounting means 37 on the first output portion 18 of the planetary gear unit section 38 during operation of the tape mounting means 37.

Reference numeral 70 denotes a hook portion provided on a portion of the locking means 66. The hook portion 70 is adapted to retain the engaging portion 67 of the cassette housing 131 when the locking means 66 is rotated in the direction of an arrow (h). Reference numeral 71 denotes a stopper portion for preventing the rotation of the locking means 66, while 72 denotes a shaft for holding the locking means 66. Reference numeral denotes a second resilient member engaging in one hand with a portion of the locking means 66 and on the other hand with the base plate 1, and having an initial tension at least equal to that of the first resilient member 68. Reference numeral 74 designates an arm provided on a portion of the locking means 66. The arrangement is such that the arm 74 presses a switch (not shown) when the locking means 66 is rotated in the direction of the arrow (h). The locking means 66 is adapted to move as a unit with the operation mode switching means 14 until a portion thereof is stopped by the stopper portion 17. Thereafter, the operation mode switching means 14 moves solely leaving the locking means 66. The operation mode switching means 14 is provided with a cam portion 75 adapted to be contacted by a contact ring 78 which is fixed to a direction switching lever 76 adapted to rotate around a shaft 77 provided on the base plate 1. The cam portion 75 rotates in the direction of an arrow (j) as the operation mode switching means 14 is moved in the direction of an arrow (i). A slide plate 79 is adapted to be slided along a pin 80 provided on the base plate 1 and is adapted to make an engagement at its end with the direction switching lever 76 to move as a unit therewith. Namely, the slide plate 79 is adapted to move in the direction of an arrow (k) as the direction switching lever 76 rotates in the direction of the arrow (j). Although not shown, a reel base braking means is adapted to be dismissed by the movement of the slide plate 79.

A reset spring 83 is adapted to reset the slide plate from the operating condition also to press the contact ring 78 into contact with the cam portion 75 of the operation switching means 14. As will be seen from FIG. 8, an idler arm 82 provided at its portion with a stepped groove 87 is fixed to a shaft 81 having a slide groove 84 which is adapted to engage with the groove portion 86 of the slide plate 79. A shaft 85 is fixed to the center of the stepped groove 87 of the idler arm 82 and rotatably carries a driving idler 13. As shown in detail in FIGS. 8 and 9, a recess 90 is formed at the side of the idler arm 82 adjacent to the center pulley 12. The recess 90 has a radius substantially equal to or greater than that of a resilient ring 89 integrally connected to the center pulley 25. The recess 90 is adapted to contact with the resilient ring 89 before the driving idler 13 comes into contact with the center pulley 12 as the driving idler 13 is moved toward the center pulley 12, thereby to deflect the driving idler 13 in the direction of the center pulley 12 if the latter is rotating either clockwise or counterclockwise. If the center pulley 12 is not rotating, the resilient ring 89 is made to engage with the recess 90 so that the driving idler 13 is not deflected either to the left nor right to take the neutral position.

A balance plate 88 is engaged at its one side by the stepped groove 87 of the idler arm 82 while the other side of the same makes an engagement with an arm portion 92 of the slide plate 79 through a spring 91. The idler arm 82, center pulley 12 and the spring 91 are arranged on a line, so that the driving idler 13 presses the center pulley 12 without fail during operation.

Referring back to FIG. 1, reference numeral 93 designates stroke limiting members for limiting the starting and stopping stroke ends of the tape mounting means 37. The limiting member 93 for the starting end may be a microswitch or the like.

Figure 12:
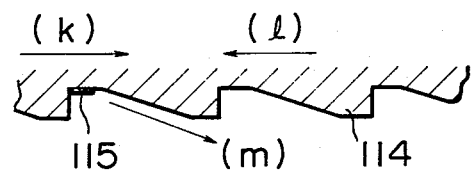
Figure 13:
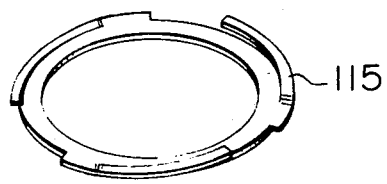

A description will be made hereinunder as to the pay-off reel base 35 and the tension servo unit 113 with reference to FIGS. 11 thru 14. Reference numeral 94 denotes a shaft standing upright from the base plate 1. A cassette base 95 is rotatably fitted around the shaft 94. An engaging ring 96, which integrally connects the cassette reel base 35 to the cassette reel, makes a sliding engagement with one end of the cassette base 95 while being prevented from rotating. Reference numeral 97 denotes a spring which is adapted to bias the engaging ring 96 in one direction, while 98 denotes a stopper ring adapted for preventing the engaging ring 96 from being withdrawn from the cassette base 95. The stopper ring 98 is fixed to the cassette base 95. A braking ring 99 rotatably fits to the other side of the cassette base 95. Also, a cam 114 having a cross-sectional shape as shown in FIG. 12 is formed on a portion of the braking ring 99. A clutch leaf spring 115 makes a pressure contact at its one side with the surface of the cam 114 and is fixed at its other side with the cassette base 95. The clutch leaf spring 115 constitutes, in combination with the braking ring 99, a one-way clutch which operates as follows. Namely, when the braking force exerted by the later-mentioned tension servo unit 113 is applied to the braking ring 99 in the direction of an arrow (k) in FIG. 12, which direction being usually the direction of tape running for recording/playback and forwarding, the braking ring 99 takes a state fixed on the clutch leaf spring 115 on the surface of the cam 114, so that the operation ring 99 operates as a unit with the cassette base 95. To the contrary, when the braking force is applied in the direction of an arrow (l), which direction being usually the direction of tape running for rewinding, the braking ring 99 and the cassette base 95 moves as a unit with each other provided that the braking force is smaller than the friction force generated by the pressure exerted by a clutch leaf spring 115, but the clutch leaf spring 115 is moved in the direction of an arrow m to permit the braking ring 99 and the cassette base 95 to slide on each other as the braking force is increased beyond the level of the friction force.

This one-way clutch effectively prevents the application of an extraordinarily large braking force by the tension servo unit 113 to the pay-off reel base 35 which may occur in the case where, for example, the magnetic tape 21 solely runs in the reverse direction in the recording/playback mode.

Figure 14:
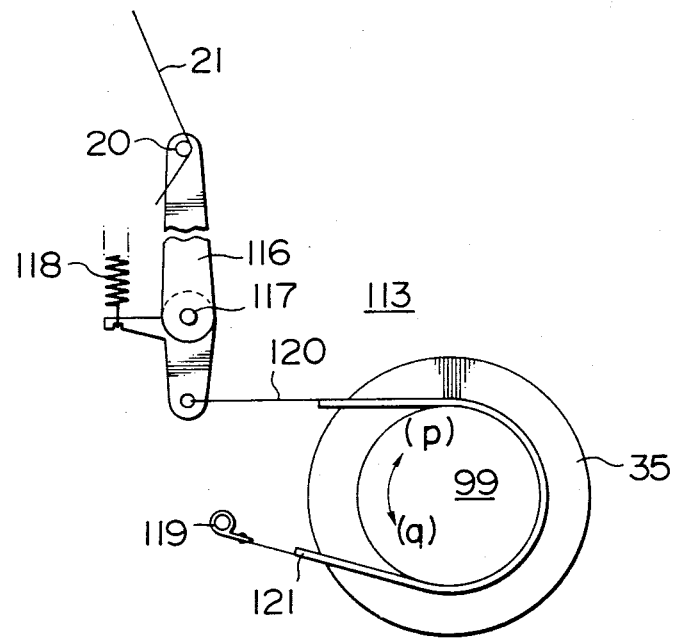
FIG. 14 is an illustration of whole part of a tension servo unit.

Referring now to FIG. 14, a tension arm 116 is rotatably connected to a shaft 117 standing upright from the base plate 1. A tension support post 20 is fixed to one side of the tension arm 116 while the other side of the same retains a spring 118 for setting the level of the load. To another portion of the tension arm 116, fixed is a tension band 120 fixed at its one end to the shaft 119 and wound round the braking ring 99 of the reel base 35 by a predetermined amount. A brake shoe 121 fixed to the tension band 120 is made of a nonwoven fabric or a leather. The tension arm 116, tension servo post 20, tension band 120 and other related members in combination constitute the tension servo unit 113. In the recording/playback mode for example, the tension post 20 contacts the magnetic tape 21 while the brake shoe 121 makes a contact with the braking ring 99 of the reel base 35, thereby to impart to the reel base 35 a feedback braking force from the tension servo post 20 to effect a back tension control of the magnetic tape 21.

The sequence of the operation of the device having the described construction will be explained hereinunder. Namely, the state of locking of the engaging portion 67 on the cassette housing 131 will be explained with reference to FIGS. 1, 4, 7 and 15. Then, the state of mounting of the magnetic tape 21 will be explained in connection with FIG. 15. Also, the state of stopping, state of recording/playback and the state of reginding/forwarding will be explained with reference to FIGS. 16, 17 and 18, respectively. Finally, the state of demounting of the cassette will be explained in connection with FIGS. 19 and 7.

Figure 15:
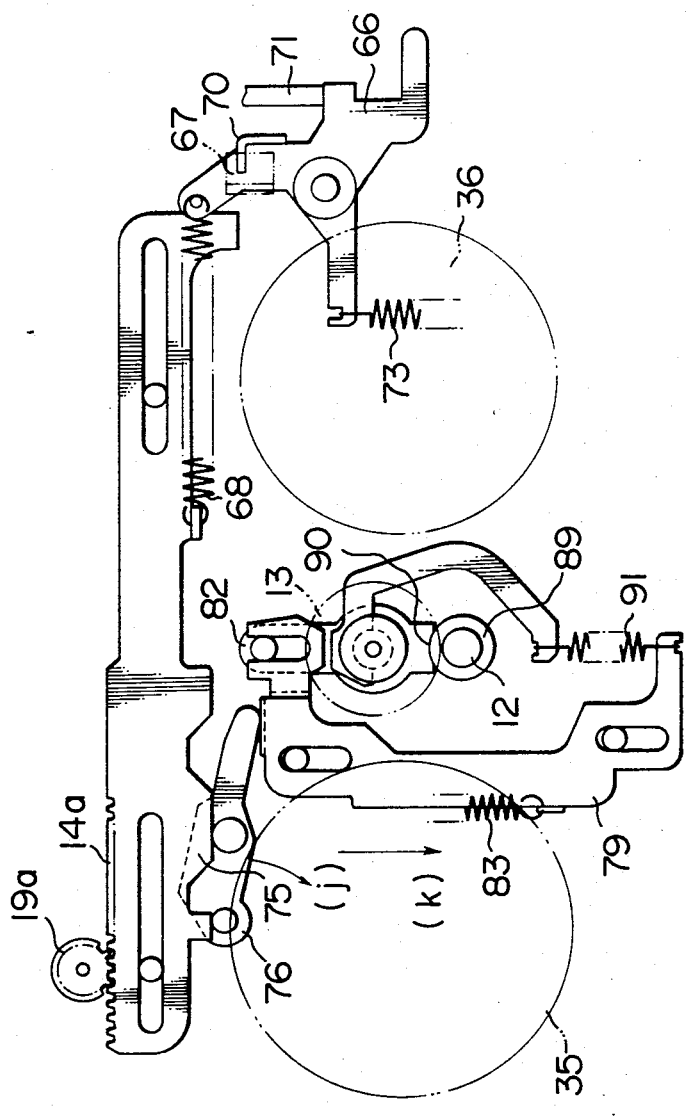
FIG. 15 is an illustration of the driving section in the state loaded with the tape.

First of all, the operation for locking the engaging portion 67 will be described with specific reference to FIGS. 1, 4, 7 and 15. Before the operation of the device, a cassette 9 is housed by the cassette housing 131 which is then mounted on the device in the manner explained before. Then, as a certain operation such as, for example, recording/playback is selected by turning the corresponding switch on, the motor constituting the driving power source of the planetary gear unit section 38 starts to operate forwardly to rotate the worm 40 directly connected to this power source. The rotation of the worm 40 in one hand is transmitted to the first output portion 18 through the sun gear 52, planetary gear 45 and the arm gear 47 and, on the other hand, to the second output portion 19 through the sun gear 52, planetary gear 45 and the internal gear 48. In this state, the first output portion 18 of the planetary gear unit section 38 is loaded by the tape mounting means 37, while the resetting force of the second resilient member 73 in the stretched state and retained by the locking means 66 acts on the second output portion 19. Therefore, the level of the load imposed by the tape mounting means 37 is relatively large so that the driving torque of the planetary gear unit section 38 is transmitted to the second output portion 19 to drive the operation mode switching means 14 and the locking means 66 as a unit in the directions of the arrows (i') and (h), respectively. In consequence, the hook portion 70 of the locking means 66 makes an engagement with the engaging portion 67 as shown in FIG. 15, and the cam portion 75 of the direction switching lever 76 is rotated in the direction of the arrow (j), so that the slide plate 79 engaging the direction switching lever 76 is moved in the direction of the arrow (k) overcoming the force of the spring 83. At the same time, the reel base braking means is dismissed by this operation. In this state, the center pulley 12 is not rotating, so that the recess 90 of the idler arm 82 presses the resilient ring 89 integrally fixed to the center pulley 12 by the force exerted by the spring 91. Therefore, the driving idler 13 is held in the pressed condition, i.e. at the neutral position, without being deflected neigher towards the reel base nor the reel base 36, thereby to free these reel bases 35 and 36.

As the operation mode switching means 14 and the locking means 66 are moved further in the directions of the arrows (i') and (k), respectively, the locking means 66 comes to contact at a portion thereof with a stopper 71. In this state, the resetting force exerted by the second resilient member 73 no more acts on the locking means 66, so that the load imposed by the first resilient member 68 is applied to the second output portion 19 of the planetary gear unit section 38. Since this load is greater than the operation load of the tape mounting means 37 applied to the first output portion 18, the driving torque of the planetary gear unit section 38 is switched from the second output portion 19 to the first output portion 18 so that the tape mounting means 37 starts to rotate by the power transmitted through the first output operation 18, thereby to extract the magnetic tape 21 from the cassette 9.

Figure 16:
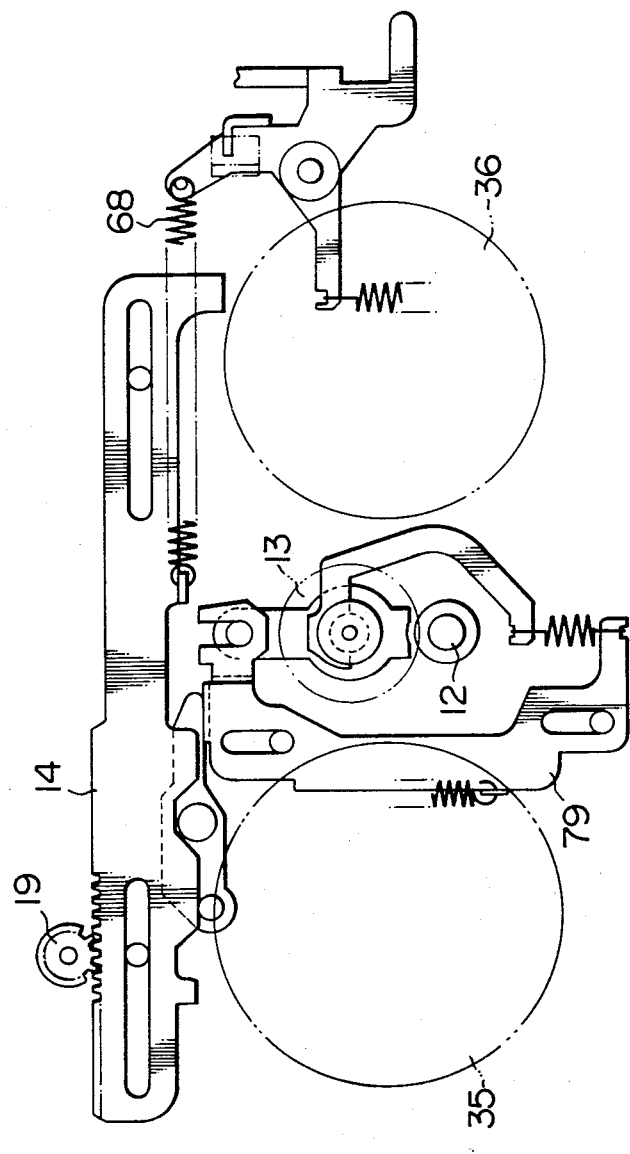
FIG. 16 is an illustration of the driving section in the state in which the device does not operate.

The operation between the tape mounting state and the stopping state will be explained with reference to FIGS. 1, 15 and 16.

As the application of the driving power of the planetary gear unit section 38 is switched from the second output portion 19 to the first output portion 18, the main ring 15 and the auxiliary ring 16 constituting the tape mounting means 37 connected to the first output portion 18 are rotated in the direction of the arrow n in FIG. 1 and are moved along the guide plate 64. Then, the magnetic tape 21 is extracted from the cassette 9 by the extraction post 26 and is successively mounted on the magnetic head drum 22, audio control head 23, audio erase head 24, full erase head 25 and the posts 30 and 31. Since the main ring 15 and the auxiliary ring 16 are constituted as a differential gear, the main ring 15 rotates at a higher speed than the auxiliary ring 16. Since the braking means for the reel bases 35 and 36 have been dismissed and since the driving idler 13 is held in the neutral position without being deflected in either direction, the tape 21 can be extracted from the cassette 9 smoothly without any excessive force applied thereto. As the rotation is continued, the tape extraction post 26 and the correction posts 27, 28 and 29 are moved to predetermined positions. Namely, the correction posts 27, 28 and 29 are brought into contact with the guide 151 and, thereafter, the extraction post 26 is made to contact with the stopper 150 so that the rotation of the tape mounting means 37 is stopped. As a result, the operation load imposed on the first output portion 18 of the planetary gear unit section 38 is increased abruptly, to a level in excess of the load imposed by the first resilient member 68. As the relationship between the levels of the loads is inversed as described, the application of the driving power of the planetary gear unit section 38 is switched again from the first output portion 18 to the second output portion 19, so that the operation mode switching means 14 connected to the second output portion 19 is moved solely overcoming the force of the first resilient member 68 to create the stopping state as shown in FIG. 16. The operation mode switching means 14 is then stopped upon contact with a position detection switch (not shown). In this state, the driving idler 13 has been dismissed from the neutral position shown in FIG. 15 and is reset to the starting position. At the same time, the brake means for the reel bases 35 and 36 are put into effect.

Figure 17:
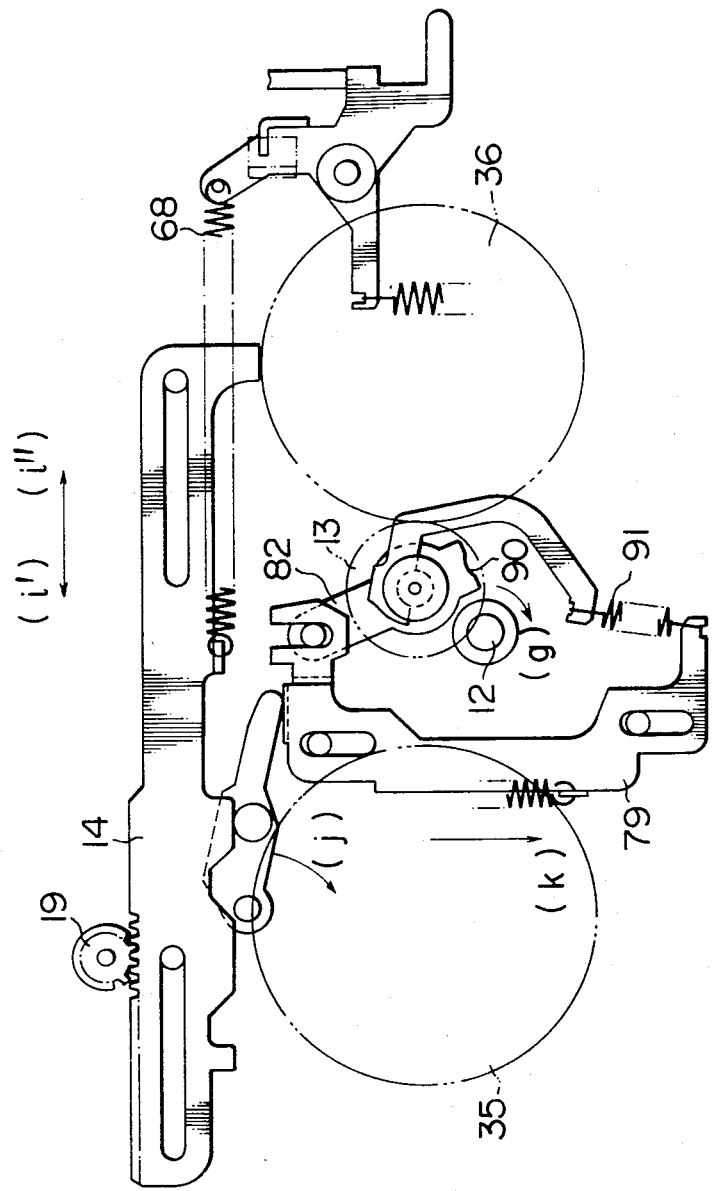
FIG. 17 is an illustration of the driving section in the recording/playback mode.
Figure 18:
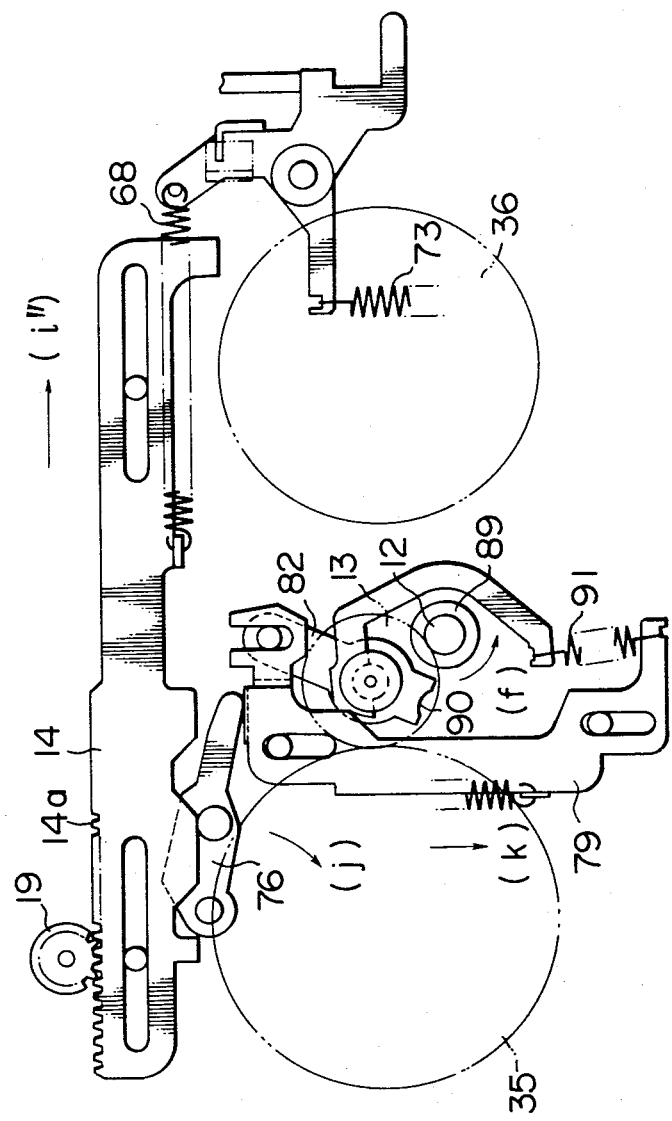
FIG. 18 is an illustration of the driving section in the rewinding/forwarding mode.

The recording/playback operation of the device will be explained in connection with FIG. 17 hereunder. As one of the switches for the recording or playback operation is turned on in the stopped state shown in FIG. 16 (the mechanisms and operations for recording and playback are materially identical), the driving power of the planetary gear unit section 38 continues to be applied in the forward direction to the second output portion 19 for the reasons stated before, so that the operation mode switching means 14 is further moved in the direction of the arrow (i'), and is stopped in the state shown in FIG. 11 in which the position detection switch operates.

Under this circumstance, the slide plate 79 is moved in the direction of an arrow (k) because the direction switching lever 76 is rotated in the direction of the arrow (j), so that the driving idler 13 is brought into contact with the center pulley 12. Since the center pulley 12 is rotating in the direction of the arrow (g), the resilient ring 89 of the center pulley 12 kicks the recess 90 of the idler arm 82 so that the driving idler 13 is deflected toward the take-up reel base 36 and is moved by the force of the spring 91 into the position between the center pulley 12 and the take-up reel base 36. In this state, the rotation of the center pulley 12 is transmitted to the take-up reel base 36 through the driving idler 13.

Figure 3:
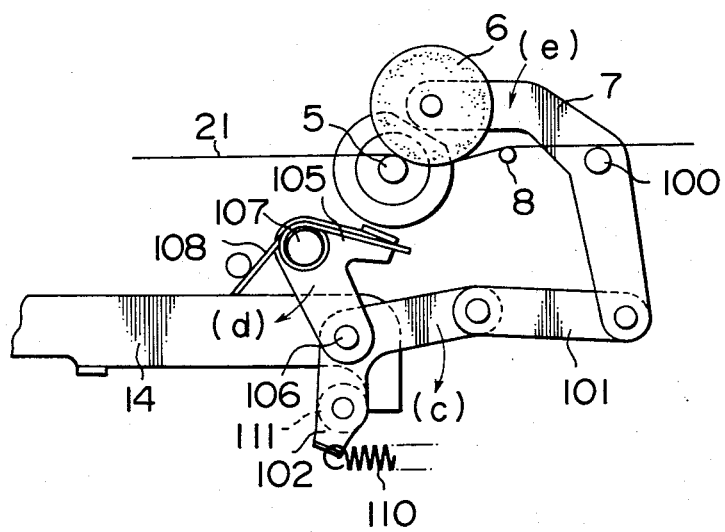

Meanwhile, the braking means is dismissed by the action of the slide plate 79 and the pinch roller 6 is pressed against the capstan 5 by the operation of the operation mode switching means 14 as shown in FIG. 3. Also, the tension servo post 20 operates in the manner shown in FIG. 14, so that the magnetic tape 21 is fed at a constant speed by the cooperation between the pinch roller 6 and the capstan 5 and is taken-up softly by the take-up reel 10 to permit the recording or playback.

For turning the device from the recording/playback mode to the stopping state, the stop switch is turned on to make the driving source of the planetary gear unit section 38 backwardly. Since the force of the first resilient member 68 acts as a resetting force, the load applied to the second output portion 19 is lighter than the load applied to the first output portion 18, so that the reversing driving power from the planetary gear unit section 38 is transmitted to the second output portion 19 in the backward direction, so that the operation mode switching means 14 connected to the second output portion 19 is moved in the direction of an arrow (i''). Then, as a result of operation of a position detecting switch, the operation mode switching means 14 is stopped in the state illustrated in FIG. 16, and the driving idler 13, pinch roller 6, tension servo post 20 and other related members are reset to the starting positions.

If the switching of the operation of the device is made from the recording mode to the stopping mode or to the temporary stopping mode (pause), the operating condition is automatically changed from the above-described stopping to the playback mode for a predetermined length of time. In this state, however, the center pulley 12 and the capstan 5 are rotating in the reverse directions, so that the temporary playback serves to rewind the magnetic tape by a predetermined amount. This temporary rewinding of the magnetic tape 21 is intended for reduction of the noise which may be involved in the portion of discontinuity of signal when the recording is made subsequently. Namely, the recording section which is driven aback slightly takes the playback mode for a while to obtain a synchronism of signals of the servo system including the head drum 22 and the capstan 5. Then, the operation is switched to the recording mode after the synchronism is attained. In this case, as stated before, the pay-off reel base 35 is rotating in the direction of the arrow p in the recording state while the tension servo band 120 and the braking ring 99 are contacting in the releasing direction. As the running direction of the magnetic tape 21 is reversed in this state, the pay-off reel base 35 starts to rotate in the direction of the arrow (g) so that the tension servo band 20 and the braking ring 99 make stronger contact with each other to apply an excessively large braking force temporarily. However, in such a case, the aforementioned clutch leaf spring 115 serves to prevent the application of braking force in excess of a predetermined level to the pay-off reel 11 by permitting the braking ring 99 of the pay-off reel 35 to idle. Accordingly, the magnetic tape 21 is protected from application of any excessive braking force which may damage the tape 21. This arrangement offers a great favourable effect in the case where the tape runs in the reverse direction as in the case of ordinary backward playback, slow backward playback, quick backward playback and so forth.

An explanation will be made hereinunder as to the rewinding and forwarding operation. The rewinding and forwarding are effected by the same mechanism in the same manner of operation, although the direction of rotation of the center pulley 12 is differed as indicated by arrows (f) and (g) in both cases. Therefore, the explanation will be made mainly concerning the rewinding operation with specific reference to FIG. 18. As the rewinding switch is turned on, the driving power source of the planetary gear unit section 38 is reversed and this reverse driving power is transmitted to the second output portion 19 due to the same reason as that explained before in connection with the switching of operation form the recording/playback mode to the stopping state. In consequence, the operation mode switching means 14 connected to the second output portion 19 is moved in the direction of an arrow (I'') and is stopped in the state shown in FIG. 18 in which the position detection switch operates. At this time, the direction switching lever 46 is rotated in the direction of the arrow (j) so that the slide plate 76 is moved in the direction of the arrow (j) so that the slide plate 76 is moved in the direction of the arrow (k) thereby to bring the driving idler into contact with the center pulley 12.

At this time, since the center pulley 12 is rotating in the direction of the arrow (f), the recess 90 of the idler arm 82, which is in contact with the resilient ring 89 on the center pulley 12, is kicked in the direction of the arrow (f). In consequence, the driving idler 13 on the idler arm 82 is driven by the spring 91 tightly into the space between the center pulley 12 and the pay-off reel base 35 thereby to transmit the torque of the center pulley 12 to the pay-off reel base 35 to effect the rewinding of the magnetic tape 21.

For switching the operation from the rewinding mode to the stopped state of the device, the stop switch is turned on so that the driving power source of the planetary gear unit section 38 is rotated forwardly and the forward torque is transmitted to the second output portion 19 for the same reason as stated before, thereby to move the operation mode switching means 14 connected to the second output portion 19 in the direction of the arrow (i'). The operation mode switching means 14 is stopped in the state shown in FIG. 16 in which the position detection switch operates.

Figure 19:
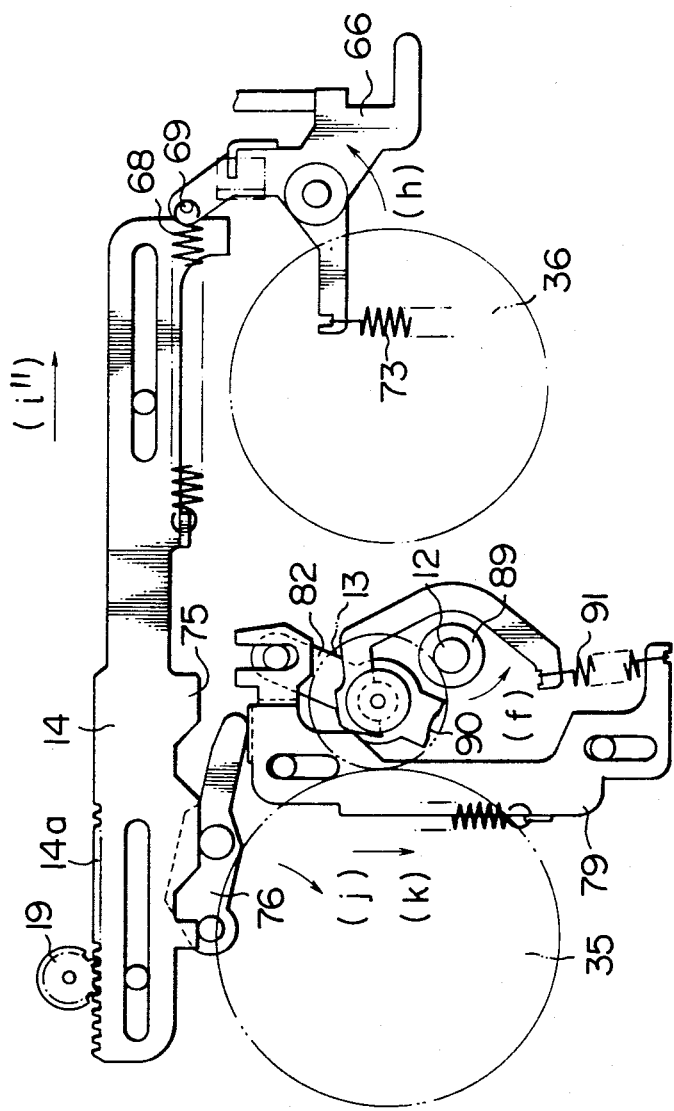
FIG. 19 is an illustration of the driving section in the state for taking out the cassette.

An explanation will be made hereinunder as to the operation for demounting the cassette, with specific reference to FIGS. 19 and 7. As the cassette demounting switch is turned on in the stopped state of the device shown in FIG. 16, the driving power source of the planetary gear unit section 38 is operated in the backward direction and the torque is transmitted to the second output portion 19 because, in this state, the force of the first resilient member 68 is applied as the resetting force to the second output portion 19. In consequence, the operation mode switching means 14 connected to the second output portion 19 is moved in the direction of the arrow (i'') to make contact with the pin 69 fixed to the locking means 66 as shown in FIG. 19. As a result, the resetting force exerted by the first resilient member 68 is extinguished, and the second output portion 19 of the planetary gear unit section 39 comes to receive the load imposed by the second resilient member 73 solely. In this state, the level of the load applied to the second output portion 19 is higher than that applied to the first output portion 18. In consequence, the application of the driving power of the planetary gear unit section is switched from the second output portion 19 to the first output portion 18, so that the tape mounting means 37 connected to the second output portion 18 is moved in the direction of the arrow o in FIG. 1. At the same time, the direction switching lever 76 and the slide plate 79 are moved in the directions of the arrows (j) and (k), respectively, as a result of movement of the cam portion 75 of the operation mode switching means 14. Therefore, the driving idler is brought into contact with the center pulley 12.

Since the center pulley 12 is rotating in the direction of the arrow (f) in this state, the recess 90 of the idler arm 82 contacting the resilient ring 89 on the center pulley 12 is directed in the direction of the arrow (f), so that the driving idler 13 provided on the idler arm 82 is biased by the spring 91 into the position between the center pulley 12 and the pay-off reel base 35 to make a strong contact therewith to permit the transmission of torque from the center pulley 12 to the pay-off reel base 35. In consequence, the pay-off reel is rotated to take-up any slack in the magnetic tape 21 attributable to the resetting of the tape mounting means 37 in the direction of the arrow (o).

As this operation is continued, the magnetic tape 21 is wholly wound in the cassette 9 and the projection 15' of the main ring 15 is made to contact with the unload end stopper 93 thereby to prevent any further movement of the tape mounting means 37. In consequence, the level of the load imposed on the first output portion 18 of the planetary gear unit section 38 is increased rapidly and comes to exceed the level of the load applied to the second output portion 19 of the same. As a result, the application of the torque of the planetary gear unit section is changed from the first output portion 18 to the second output portion 19, so that the operation mode switching means 14 and the locking means 66 are moved as a unit with each other from the state shown in FIG. 19 to the state shown in FIG. 7 overcoming the force of the second resilient member 73, and are made to stop at this position where the position detection switch operates. In the course of movement of the operation mode switching means 14 from the position shown in FIG. 19 to the position shown in FIG. 7, the cam portion 75 of the means 14 acts to reset the driving idler 13. At the same time, the locking of the engaging portion 67 by the hook portion 70 is dismissed, thereby to permit the demounting of the cassette 9.

Figure 20:
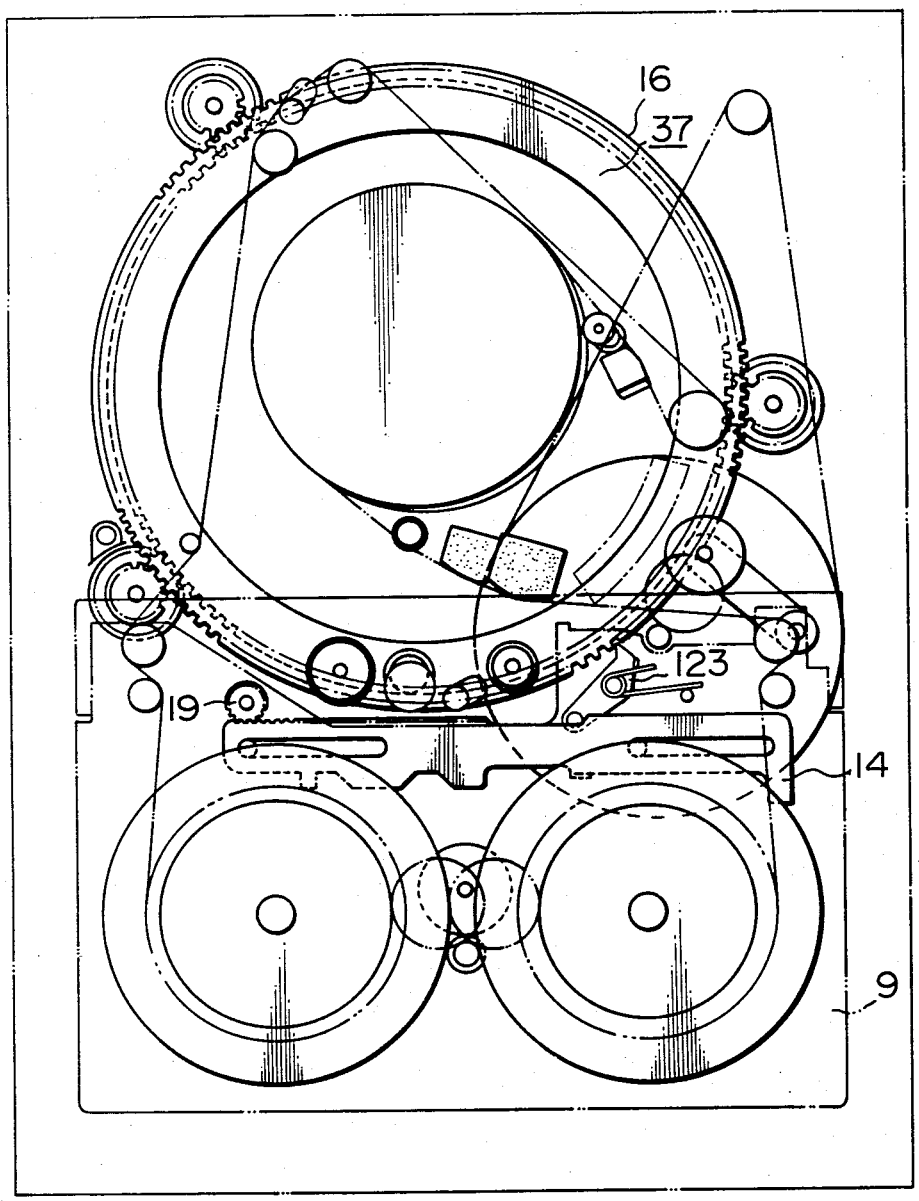
FIGS. 20 to 22 are illustrations showing general arrangement of another embodiment.
Figure 21:
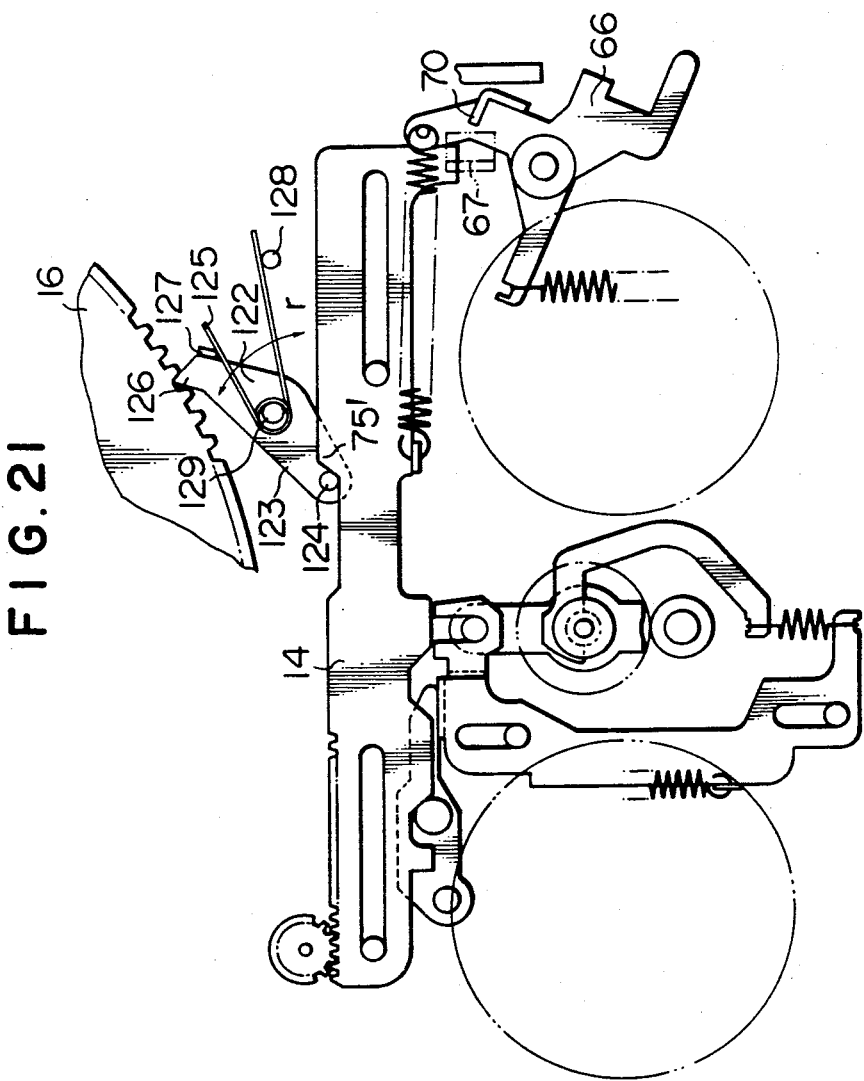
Figure 22:
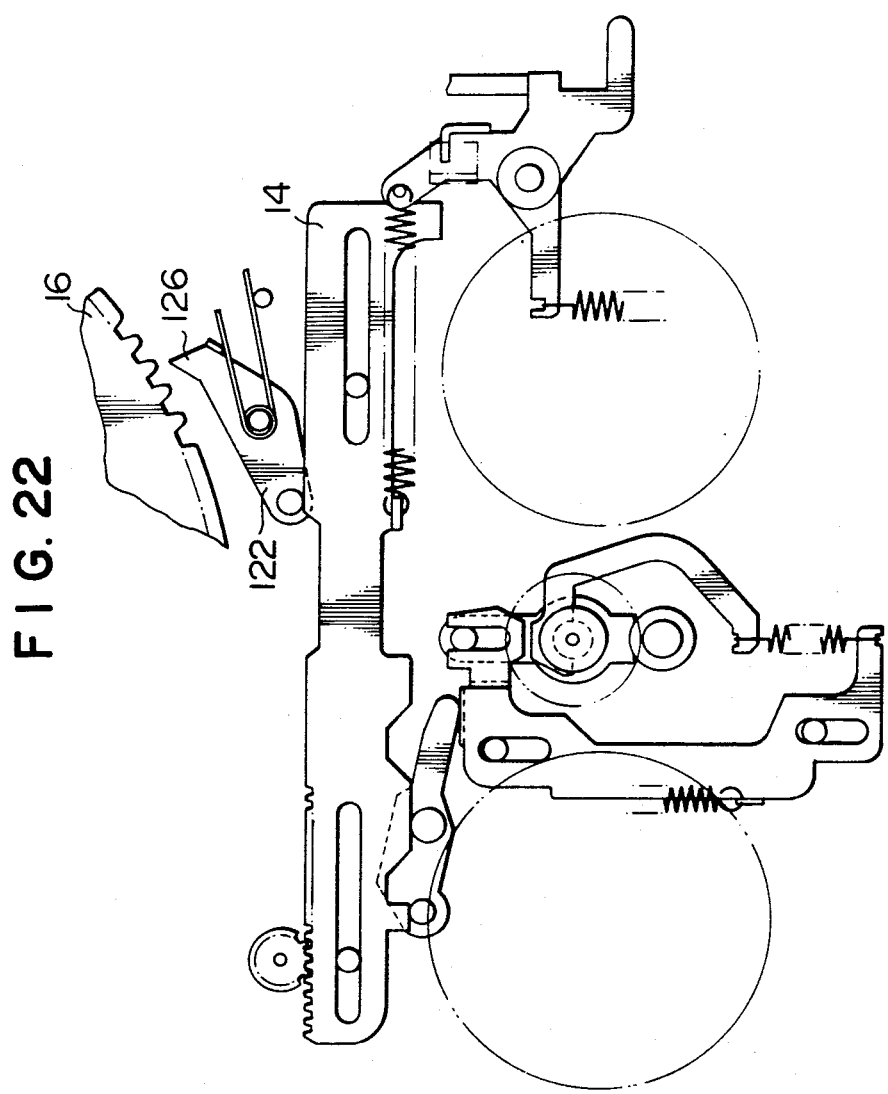

A magnetic recording/playback device of another embodiment of the invention, improved to further ensure the switching of operation mode in the first embodiment, will be described hereinunder with specific reference to FIGS. 20 to 22.

A retainer lever 123 constituting a limiting means 122 is provided at its one side with an engaging pin 124 which is biased by a spring 125 into engagement with the cam portion 75' of the aforementioned operation mode switching means 14. The retainer lever 123 is provided at its other side with a toothed portion 126 for engagement with the auxiliary ring 16 (or main ring 15) of the tape mounting means 37. The arrangement is such that, as the operation mode switching means 14 is moved in the direction (i') or (i''), the retainer lever 123 is rotated in the direction of the arrow (r) thereby to limit the rotation of the tape mounting means 37. The spring 125 is retained at its one end by a retainer 127 provided on the retainer lever 123 and at its other end by a retainer 128 provided on the base plate 1. The retainer lever 123 and the spring 125 are rotatably carried by a shaft 129. The operation of the magnetic recording/playback device of the second embodiment is as follows.

The operation is basically same as that of the first embodiment. FIG. 20 shows the state in which the cassette housing 121 encasing the cassette 9 is mounted on the device. In this state, the engaging pin 124 and the toothed portion 126 are in engagement with the cam portion 75' and the auxiliary ring 16, respectively, thereby to limit the movement of the cam portion 75' and the auxiliary ring 16. As a certain operation mode, such as recording or playback, is selected by a depression of the corresponding switch, the motor as the driving power source of the planetary gear unit section 38 is operated forwardly to rotate the worm 40 connected thereto. The output power of the worm 40 is transmitted to the second output portion 19 for the reason explained before in connection with the first embodiment, so that the operation mode switching means 14 and the locking means 66 are moved as a unit with each other in the directions of the arrows (i') and (h), respectively.

In consequence, the hook portion 70 of the locking means 66 is brought into engagement with the engaging portion 67, and the direction switching lever 76 is rotated in the direction of the arrow (j) by the cam portion 75 of the operation mode switching means 14. The movement of the cam portion 75' of the operation mode switching means 14 causes also a rotation of the retainer lever 123 in the direction of the arrow (r) from the position shown in FIG. 20 (or FIG. 21) to the position shown in FIG. 22, so that the locking of the auxiliary ring 16 by the retainer lever 123 is dismissed to permit the rotary portion of the tape mounting means 37 to rotate.

Therefore, the tape mounting means 37 becomes operative only after the engaging portion 67 is locked by the hook 70. This arrangement provides a protection of the tape 21 against any damaging force which may be caused by the operation of the tape mounting means 37. In the demounting of the cassette, the retainer lever 123 contacts the auxiliary ring 16 to effect the locking, if the engaging portion 67 has been unlocked from the hook 70.

The magnetic recording/playback device of the first and second embodiments described heretofore offer the following advantages.

(i) It is possible to actuate the tape mounting means 37 and the operation mode switching driving means in good sequence by a single driving power source, by a switching of the load applied to the driving power source. In consequence, the number of parts is reduced and the construction is simplified to permit the reduction in size and weight of the recording/playback device.

(ii) The simplified construction as mentioned in item (i) above in consequence permits the independent adjustment of operation of each constituent. The assembling and adjustment can be made by way of units. Also, the adjustment of operation timing of mechanisms in relation to each other is omitted.

(iii) The assembling and adjustment by way of units mentioned above item (ii) ensures a higher precision of operation of each mechanism and, hence, the higher reliability of operation of the device as a whole.

(iv) The reduction in size and weight of the device is further promoted by the arrangement in which the tape mounting means 37, operation mode switching means and the locking of the cassette container 131 are made in sequence by a single driving power source. The use of single driving power source contributes also to the saving of energy.

(v) The sequential operation mentioned in the above item (iv) is made as follows. Namely, in starting the operation of the device, the cassette housing 131 is locked first of all and other parts are operated only after the locking. Also, for permitting the demounting of the cassette, at first the tape mounting means and the reel driving means are reset to the starting condition and then the magnetic tape is rewound. The locking of the cassette housing 131 is dismissed only after the rewinding of the tape. This arrangement ensures a high precision of operation of the device.

(vi) Besides the advantage stated in the item (v) above, the precision of the operation mode switching driving means and the tape mounting means is further enhanced by the provision of the limiting means.

What is claimed is:

1. A magnetic recording/playback device comprising:
    a planetary gear unit section connected at its input side through a reversing prevention means to a driving power source and having a first output portion and a second output portion;
    a tape mounting means having at least a magnetic tape extracting post mounted thereon, said tape mounting means being connected to said first output portion of said planetary gear unit section;
    an operation mode switching driving means connected to said second output portion of said planetary gear unit section;
    a locking means for locking and releasing a cassette housing;
    a first resilient member engaged at one end by said operation mode switching driving means and at another end by said locking means and having an initial tension greater than a load imposed by said tape mounting means connected to said first output portion of said planetary gear unit section during a mounting operation;
    a second resilient member engaged by said locking means and having an initial tension greater than said load imposed by said tape mounting means during the mounting operation;
    a first stopper for limiting a range of movement of said locking means;
    stroke end limiting means for limiting terminal mounting ends of said tape mounting means; and
    a second stopper for said operation mode switching driving means, the tape mounting operation, driving mode switching operation and operation of said locking means for the cassette housing being effected by switching loads imposed on respective output portions of said planetary gear unit section.

2. A magnetic recording/playback device as claimed in claim 1, wherein said mode switching driving means includes an operation mode switching means adapted to set an operation mode of said device and a reel driving means adapted to drive reels in response to operation of said operation mode switching means.

3. A magnetic recording/playback device as claimed in claim 2, wherein said reel driving means includes a reversible center pulley disposed at a substantially midposition between a pair of reel bases and provided at its peripheral portion with a resilient ring; an idler arm rotatably carrying an idler, said idler arm having a contact surface confronting said resilient ring of said center pulley and adapted to be deflected in accordance with the direction of rotation of said center pulley to bring said idler selectively into engagement with one of said reel bases so as to transmit the torque of said center pulley to the selected reel base; a slide plate retaining said idler arm; a resilient member stretched between said idler arm and said slide plate; and a resilient member for resetting said slider plate.

4. A magnetic recording/playback device as claimed in claim 3, wherein, when said magnetic tape is extracted from said cassette and mounted on a magnetic head drum, the rotation of said center pulley constituting a part of said reel driving means is stopped to hold said idler arm in contact with said center pulley thereby to keep said idler in the neutral position away from both reel bases.

5. A magnetic recording/playback device as claimed in claim 1, further comprising a limiting means which engages in one hand with said operation mode switching means constituting a part of said mode switching driving means and on the other hand limits the operation of said tape mounting means by the action of said operation mode switching means, wherein said tape mounting means is adapted to be released from said limiting means to permit the mounting of said tape after the locking of said cassette housing by said locking means.

* * * * *